United States Patent
Jin

(10) Patent No.: US 7,660,513 B2
(45) Date of Patent: Feb. 9, 2010

(54) RECORDING STATUS DISPLAY APPARATUS AND METHOD THEREOF

(75) Inventor: Sun-kyung Jin, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1168 days.

(21) Appl. No.: 10/968,176

(22) Filed: Oct. 20, 2004

(65) Prior Publication Data

US 2005/0281538 A1    Dec. 22, 2005

(30) Foreign Application Priority Data

Jun. 22, 2004   (KR) ..................... 10-2004-0046459

(51) Int. Cl.
*H04N 5/91* (2006.01)

(52) U.S. Cl. .......................... 386/83; 386/95

(58) Field of Classification Search .................. 386/46, 386/83, 95, 125, 126
See application file for complete search history.

(56) References Cited

U.S. PATENT DOCUMENTS

| | | | | |
|---|---|---|---|---|
| 4,873,584 | A | * | 10/1989 | Hashimoto ................. 386/83 |
| 5,315,452 | A | * | 5/1994 | Hong ..................... 360/73.07 |
| 5,543,933 | A | * | 8/1996 | Kang et al. ................. 386/83 |
| 6,311,011 | B1 | * | 10/2001 | Kuroda ...................... 386/46 |
| 2002/0054750 | A1 | | 5/2002 | Ficco et al. |
| 2002/0054754 | A1 | | 5/2002 | Kikuchi et al. |
| 2002/0122080 | A1 | | 9/2002 | Kunii et al. |
| 2002/0172496 | A1 | | 11/2002 | Gunji et al. |
| 2003/0223140 | A1 | | 12/2003 | Kobata et al. |

FOREIGN PATENT DOCUMENTS

| | | |
|---|---|---|
| CN | 1323489 A | 11/2001 |
| EP | 1 102 482 A | 5/2001 |
| EP | 1 206 134 A2 | 5/2002 |
| JP | 2003-009049 | 1/2003 |
| KR | 1997-4293 | 3/1997 |
| KR | 10-212044 | 8/1999 |
| KR | 20-162985 | 12/1999 |

(Continued)

OTHER PUBLICATIONS

The First Office Action issued on Jan. 4, 2008 by the State Intellectual Property Office of P.R. China in the corresponding Chinese Application No. 200510072331.7 (6 pages) (English translation consisting of 2 pages).

(Continued)

*Primary Examiner*—Huy T Nguyen
(74) *Attorney, Agent, or Firm*—Staas & Halsey LLP

(57) ABSTRACT

An image recording/reproducing apparatus which supports recording by memorizing recording requests of a user, and a method thereof. A recording status display table stores a general recording information display part for recording such as a program recording date and a recording start time and a recording result display part for displaying a recording result. A control unit controls the recording status display table to be displayed on a display apparatus. The recording result is recorded and stored in the recording result display part of the corresponding program of the memory, and displayed if requested. As a result, the user may easily confirm the recording status without checking the recorded contents.

16 Claims, 4 Drawing Sheets

FOREIGN PATENT DOCUMENTS

| | | |
|---|---|---|
| KR | 2002-2230 | 1/2002 |
| KR | 10-331827 | 4/2002 |
| WO | WO 00/16548 A | 3/2000 |

OTHER PUBLICATIONS

Annex 2—Anonymous: "Web page showing sales start of DMR-E85H" [Online] Retrieved from the Internet: URL:http://bbs.kakaku.com/bbs/20274010084> [retrieved on Jul. 13, 2007] (1 page).

Annex 3—Panasonic: "Software update DMR-E85H" [Online] Jun. 8, 2004, Retrieved from the Internet: URL:http:/panasonic.jp/support/dvd/faq/e85h/info/> [retrieved on Jul. 13, 2007] (3 pages).

European Patent Office Communication issued Jul. 20, 2007 in Application No. 06 118 964.3—2202 (4 pages).

Panasonic.de—Pressemeldung—DVD-Rekorder DMR-E85H/DMR-E75V/DMR-E65/DMR-E55; Jan. 2004; Press Release; [online] XP-002401481; http://www.panasonic.de/presse/detail/ct_detail.aspx?newsID=8b319961-7b9d-4fle-a... (Sep. 29, 2006) (1 page).

Toshiba: "HDD/DVD Video Recorder RD-X2U Owner's Manual" [online] Sep. 3, 2002; XP002400568; Retrieved from the Internet: URL:http://www.tacp.toshiba.com/tacpassets-images/models/RD-X2U/docs/RD-X2u_om_e_1.pdf>.

Extended European Search Report issued Oct. 24, 2006 in Application No. 06118964.3—2223.

Extended European Search Report issued Oct. 24, 2006 in Application No. 06118963.5—2223.

Communciation with Partial European Search Report dated Sep. 9, 2005.

\* cited by examiner

FIG. 4

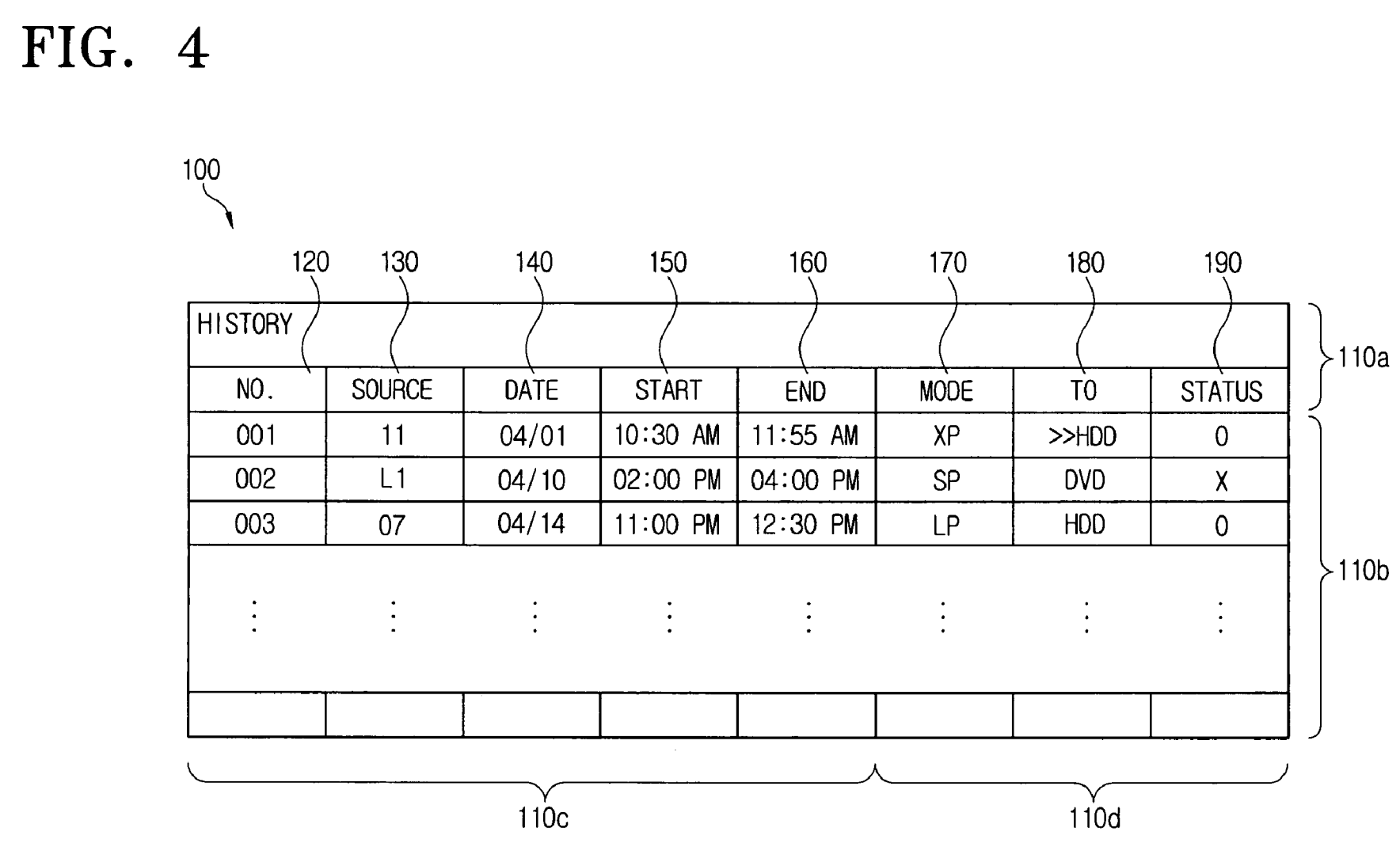

| HISTORY NO. | SOURCE | DATE | START | END | MODE | TO | STATUS |
|---|---|---|---|---|---|---|---|
| 001 | 11 | 04/01 | 10:30 AM | 11:55 AM | XP | >>HDD | ○ |
| 002 | L1 | 04/10 | 02:00 PM | 04:00 PM | SP | DVD | × |
| 003 | 07 | 04/14 | 11:00 PM | 12:30 PM | LP | HDD | ○ |
| … | … | … | … | … | … | … | … |

//  # RECORDING STATUS DISPLAY APPARATUS AND METHOD THEREOF

CROSS-REFERENCE TO RELATED APPLICATIONS

This application claims benefit of Korean Patent Application No. 2004-46459 filed on Jun. 22, 2004 in the Korean Intellectual Property Office, the disclosure of which is incorporated herein by reference.

BACKGROUND OF THE INVENTION

1. Field of the Invention

The present invention relates to an image recording apparatus and a method thereof. More particularly, the present invention is directed to a recording apparatus which supports recording by memorizing recording patterns of the user, and a method thereof.

2. Description of the Related Art

An image recording and reproducing apparatus for recording a broadcasting signal on a recording medium or reproducing the recorded broadcasting signal expands its functions according to digitalization of the broadcasting signal and development of the compression technology. The image recording and reproducing apparatus has been improved to support utilization of various image sources such as a satellite broadcast, a cable broadcast and a network broadcast based on an Internet. Furthermore, the image recording and reproducing apparatus can store data on an optical medium such as a CD-ROM (compact disc read only memory) title or a DVD (digital versatile disc) title or reproduce the stored data according to digitalization of the data and development of the compression technology. For example, the optical medium for storing image data and audio data for the DVD title generally stores a few hundred Megabytes to a few Gigabytes of data, and thus easily stores or reads a large volume of data by using an HDD (hard disk driver) which is a large capacity memory. The representative example of the image recording and reproducing apparatuses is a DVD/HDD image recording and reproducing apparatus. A DVD ROM for reproducing data recorded on a disk and an HDD for recording and reproducing data are combined in one casing. The DVD ROM and the HDD perform individual functions and share an interface for mutual data transmission and reception. In general, the DVD ROM reproduces data recorded on an optical disk recording medium such as a DVD, an audio CD, a video CD and an MP3 CD.

The DVD/HDD image recording and reproducing apparatus receives an external broadcasting signal, records data on the HDD or externally outputs the data, and records data reproduced by the DVD ROM on the HDD. When recording the signal reproduced by the DVD ROM or the external signal on the HDD, a plurality of programs are recordable on the large capacity HDD.

The DVD/HDD image recording and reproducing apparatus will now be explained with reference to FIGS. 1 and 2.

FIG. 1 is a schematic block diagram illustrating a conventional DVD/HDD combo system having a DVD player and an HDD.

The DVD reproducing apparatus includes a switching unit 10, an MPEG encoder unit 20, an HDD 30, a flash ROM 40, a control unit 50, a RAM (random access memory) 60, a light receiving unit 70, a digital signal processing unit 80 and a DVD reproducing and recording apparatus 90.

The switching unit 10 receives image data and/or voice data from sources, or outputs image data from the decoder unit 80 to display apparatus 85, for example. The switching unit 10 receives an external signal such as a component signal or a composite signal from a video source (not shown), and selectively connects the signal to functional blocks of the image recording and reproducing apparatus. For example, where the external signal is the component or composite signal, the switching unit 10 applies the signal to the MPEG encoder unit 20.

The MPEG encoder unit 20 includes a video decoder 21, an audio ADC (analog-to-digital converter) 22 and an MPEG encoder 23, AD-converts an analog image data source from the switching unit 10, and compresses the converted image data in the form of an MPEG format (for example, MPEG-2 format). Generally, when stored in a storage medium such as the HDD 30, the MPEG format image data are compressed to reduce a storage space.

The HDD 30 stores and reads the MPEG format image data and sound data in a data recording area in a form of a file.

The flash ROM 40 stores an operating system and an application program for operating the DVD reproducing recording apparatus 90 which will be explained below, and includes an application program for displaying the image data and audio data stored in the HDD 30 in the form of a file and supplementary information (such as icon, title name, recording time, and file size) on the screen through a GUI (graphic user interface) type menu, and for editing and displaying the image data and audio data through the displayed menu.

The control unit 50 stores the MPEG data from the MPEG encoder unit 20 in the HDD 30, or applies the image data and voice data stored in the HDD 30 to the digital signal processing unit 80. In order to reproduce and/or record the DVD, the control unit 50 reads information on the DVD title from the disk information file area, and records the information on a route directory area of the HDD 30. In addition, the control unit 50 reads and displays the related GUI screen from the flash ROM 40 to display on the screen the icon and title name corresponding to the image data stored in the HDD 30 in the form of a file, by executing the application program stored in the flash ROM 40.

The RAM 60 loads the file stored in the HDD 30 when the control unit 50 edits the file. That is, the file is not directly edited in the HDD 30, but edited in the RAM 60 and re-stored in the HDD 30.

The light receiving unit 70 receives a control signal (not shown) from a remote controller (not shown) for controlling the image recording and reproducing apparatus (for example, channel change, volume control, and image quality control) or a setup key of the image recording and reproducing apparatus, and applies the control signal to the control unit 50.

The digital signal processing unit 80 receives the MPEG format image data stored in the HDD 30 through the control unit 50, decodes the image data, and converts the decoded data to a video format (for example, NTSC/PAL). The converted signal can be reproduced by an image display apparatus such as a TV.

The DVD reproducing and recording apparatus 90 reads the image data and audio data from a DVD disk and applies the data to the control unit 50, or receives the signal from the control unit 50 and records the image and audio data on the DVD disk. Accordingly, the image data and audio data applied to the control unit 50 are stored in the HDD 30, or applied to and reproduced by the digital signal processing unit 80.

When the user intends to perform reservation recording by using the above apparatus, the control unit 50 displays the data stored in the flash ROM 40 and supplementary information necessary for reservation recording, such as for example, recording time, channel, recording speed (or recording density), and recording medium, input by the user on the screen through a GUI type menu as shown in a reservation recording table of FIG. 2. Generally, the user can input a recorded broadcasting channel, a reservation date, a recording start time and a recording end time as the information necessary for reservation recording. The reservation contents are stored in the flash ROM 40. In the recording time, the set channel is received by the switching unit 10, and signals are processed by the MPEG encoder unit 20 and recorded on the HDD 30. It has been described that the user directly inputs the necessary information to the reservation recording screen, but it is also possible to automatically receive and store related reservation contents by using data such as a program guide.

However, when reservation recording has been set in the image recording and reproducing apparatus, there is no way to check whether reservation recording has been successfully performed. That is, the user can confirm it by wholly reproducing the recording medium.

When the user sets reservation recording, if a plurality of recording media exists, the user can select one of the recording media. If a residual capacity of the set recording medium is deficient during recording, the set recording medium is firstly fully used, and then replaced by another recording medium. The user is not informed of change of the recording medium. Accordingly, the user has to check the recording media one by one to confirm recorded contents.

On the other hand, even though the user designates the recording speed, if a residual capacity of the recording medium is deficient, the recording speed is controlled to record the whole reservation program. There is no way for the user to confirm change of the speed.

SUMMARY OF THE INVENTION

The present invention is made to solve the above and/or other problems. One aspect of the present invention provides an image recording and reproducing apparatus which allows the user to easily confirm a reservation recording status and a recording result, and a method thereof.

According to an aspect of the present invention, there is provided a recording status display for a recording and/or reproducing apparatus comprising a memory for storing a recording status display table having a general recording information display part for recording status information such as a program recording date and a recording start time, and a recording result display part for displaying a recording result; and a control unit for controlling the recording status display table to be displayed on a display apparatus, whereby the recording result is recorded and stored in the recording result display part of the corresponding program of the memory, and displayed if requested.

The general recording information display part displays general information for reservation recording, such as a number display part, a broadcasting channel display part, a reservation recording date display part, a reservation recording start time display part and an end time display part, and the recording result display part displays changeable information after recording, such as a recording speed display part, a used recording medium display part, and a recording status display part showing completion and non-completion of recording, so that the user can easily confirm recorded contents.

The recording speed display part displays a set speed in recording, and also displays a change of the recording speed where the recording speed is changed during recording by the control unit. The used recording medium display part displays a set recording medium for recording, and also displays a change of the recording medium where the recording medium is changed during recording by the control unit. The recording status display part displays completion or non-completion of recording. Where recording has not been successfully performed, the recording status display part may further display a reason for non-completion of the recording.

The recording status display table displays a predetermined number of programs in the order of reservation recording dates. When the reservation recording dates are identical, the recording status display table displays the programs for the identical date in the order of reservation recording start time, so that the user can easily locate the corresponding program.

There is provided a recording status display method of an image recording and reproducing apparatus for receiving an external broadcasting signal, and recording the signal on a recording medium or outputting and displaying the reproduced signal to a display apparatus, including an application operation for starting recording or receiving a reservation recording application, an operation for creating a recording status display table having a general recording information display part necessary for recording such as a recording date and a recording start time set in the application operation, and a recording result display part for displaying a recording result, a time comparison operation for comparing the recording start time displayed on the recording status display table with a current time, and when the recording start time is identical to the current time in the time comparison operation, a recording operation for starting recording and recording the recording result on the recording result display part. The recording status display table is displayed on the display apparatus upon a recording status display table display request.

The general recording information display part displays general information necessary for reservation recording, such as a number display part, a broadcasting channel display part, a reservation recording date display part, a reservation recording start time display part and an end time display part, and the recording result display part displays changeable information after recording, such as a recording speed display part, a used recording medium display part, and a recording status display part showing completion and non-completion of recording.

The recording speed display part displays a set speed in recording, and also displays change of the recording speed when the speed changes during recording. The used recording medium display part displays a set recording medium in recording, and also displays change of the recording medium when the recording medium is changed during recording. The recording status display part displays completion and non-completion of recording. Preferably, when recording is successfully performed, the recording status display part further displays a reason for non-completion of recording.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a diagram illustrating a recording status table.

DETAILED DESCRIPTION OF THE PREFERRED EMBODIMENTS

Figure 1:
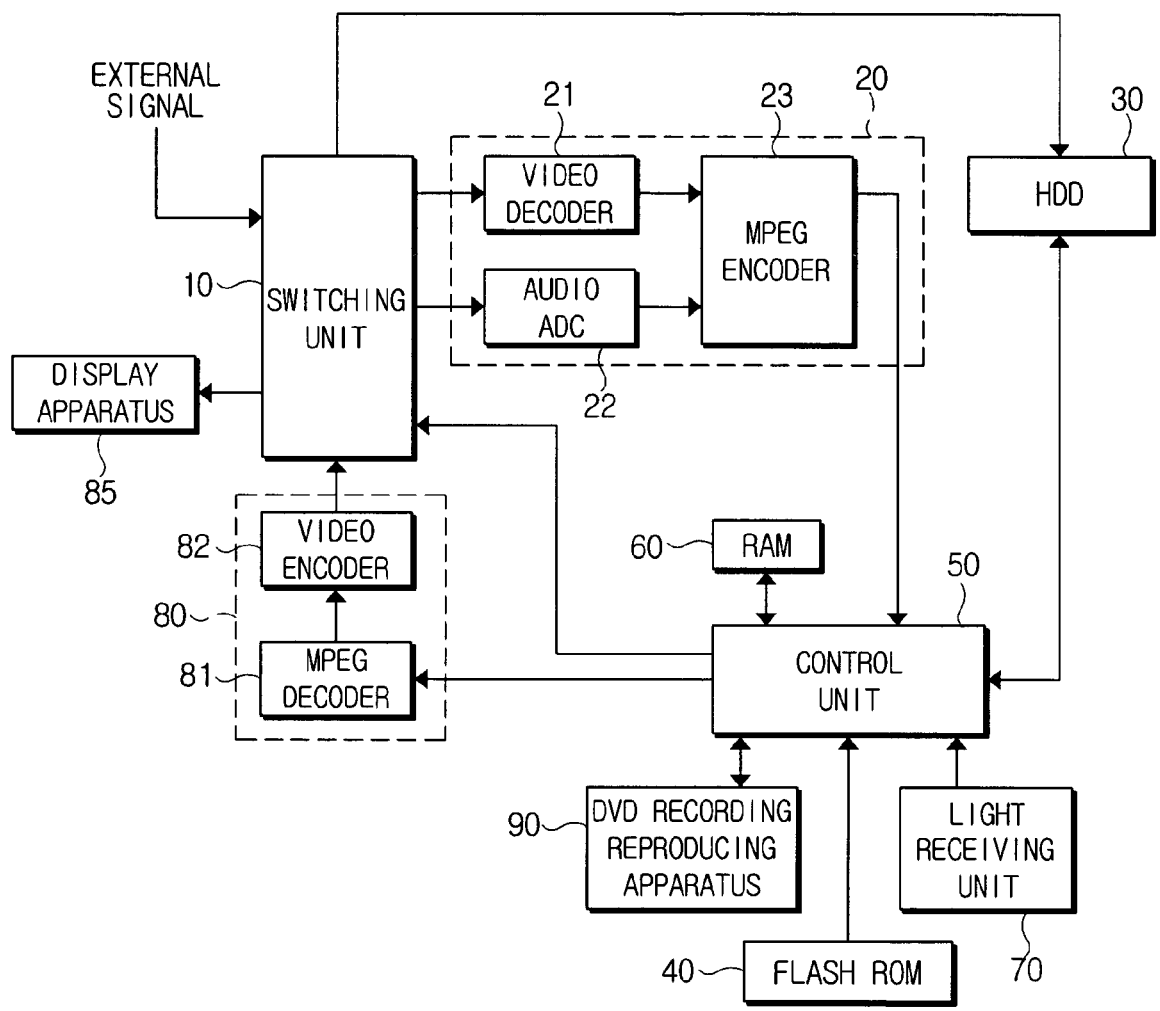
FIG. 1 is a schematic block diagram illustrating a conventional DVD/HDD combo system having a DVD player and an HDD.
Figure 2:
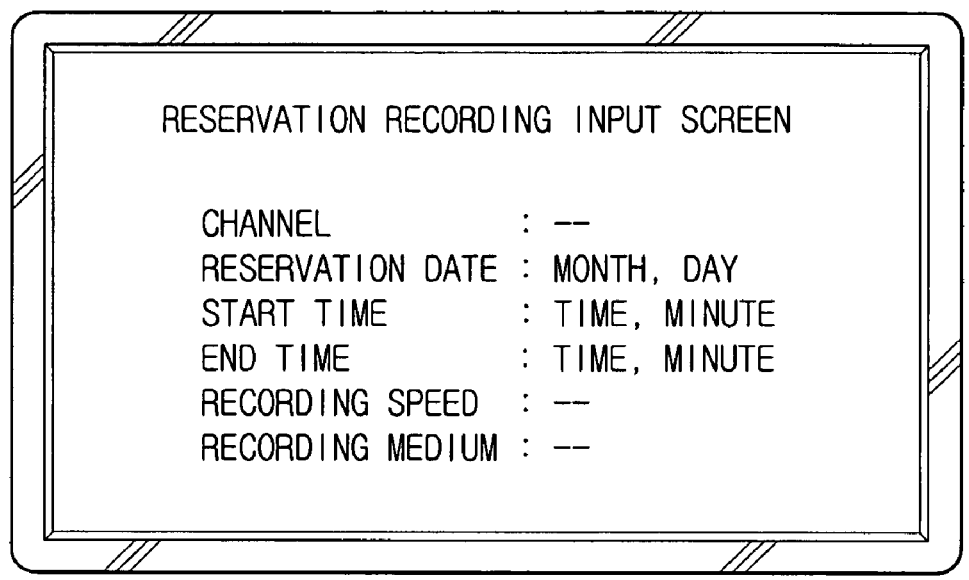
FIG. 2 is an exemplary diagram illustrating a conventional reservation recording image displayed on a screen.

Reference will now be made in detail to the embodiments of the present invention, examples of which are illustrated in the accompanying drawings, wherein like reference numerals refer to the like elements throughout. The embodiments are described below to explain the present invention by referring to the figures.

A recording status display apparatus and a method thereof according to embodiments of the present invention will now be described in detail with reference to the accompanying drawings.

Figure 3:
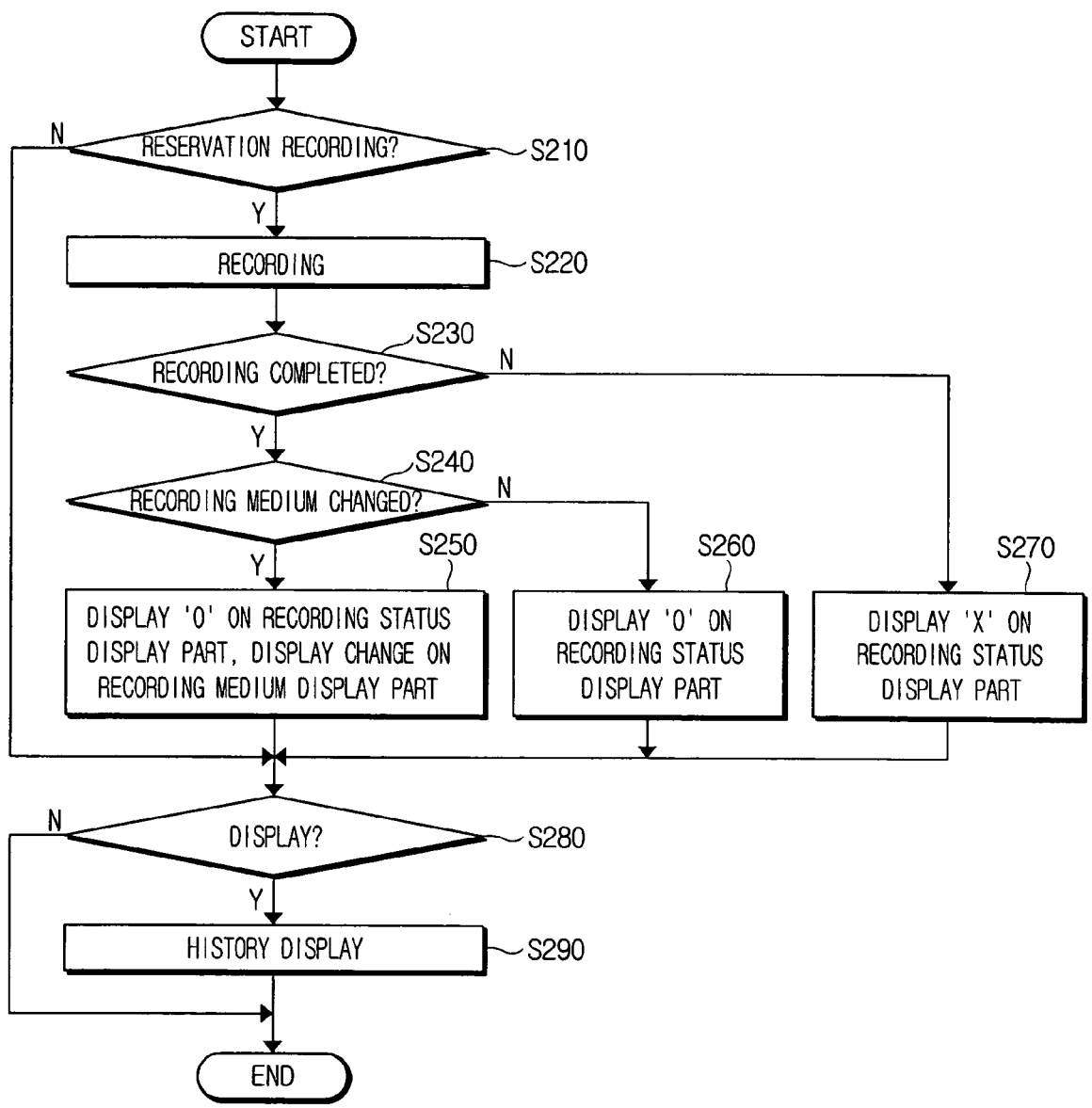
FIG. 3 is a flowchart showing operations of a recording method according to an embodiment of the present invention.

FIG. 3 is a flowchart showing sequential operations of the recording method according to an embodiment of the present invention, and FIG. 4 is a diagram illustrating a recording status table. Except for the control unit 50 and the flash ROM 40, a structure of the present invention is identical to the structure shown in FIG. 1, and detailed explanations of common features thereof are omitted. A control unit 50 and a flash ROM 40 according to the present invention will now be additionally described.

In addition to the general functions described with reference to FIG. 1, the control unit 50 records a recording status in every recording. That is, when the user sets reservation recording or when the reservation recording time elapses, the control unit 50 creates a recording status display table as shown in FIG. 4, and records and stores the table in the flash ROM 40. The recording status display table 100 is displayed based on reservation recording application dates and time. In detail, the recording status display table 100 comprises a plurality of parts which may also be referred to as fields. The plurality of parts comprises a number display part 120 showing a reservation recording application order, a broadcasting channel display part 130, a reservation recording date display part 140, a reservation recording start time display part 150, an end time display part 160, a recording speed display part 170, a used recording medium display part 180 and a recording status display part 190 showing completion or non-completion of recording. The recording status display table 100 is stored in the flash ROM 40. The number display part 120 is sequentially displayed according to the dates of the reservation recording date display part 140. Where the dates are identical, the number display part 120 may be numbered according to the start time of the recording start time display part 150. As described above, when the recording status display table 100 is stored in the flash ROM 40, the control unit 50 confirms a current time. When the current time is the reservation recording time recorded on the recording status display table 100, the control unit 50 controls the system to start recording, and displays a used recording medium and a recording status on the recording medium display part 180 and the recording status display part 190. That is, completion and non-completion of recording are displayed by 'O' and 'X'. When recording is performed, the control unit 50 displays a kind of recording medium (for example, HDD and DVD) on the recording medium display part 180. When the user applies for reservation recording, if a plurality of recording media exist, the user may select one of the recording media. Although the user selects the DVD as the recording medium, if capacity of the disk is not sufficient, the residual contents are recorded on the HDD 30 and change of the recording medium is displayed '>>HDD' on the recording medium display part 180. When the user requests display of the recording status display table 100 by using a remote controller (not shown) or a setup key (not shown) of the image recording and reproducing apparatus, the control unit 50 reads the recording status display table 100 from the flash ROM 40, and displays it on a display apparatus 85.

The recording status display table 100 will now be explained in more detail with reference to FIG. 4. The recording status display table 100 includes a table heading display part 110a and a bibliographic details display part 110b. The table heading display part 110a comprises a 'History' mark implying that the current status table displays a recording status, and appropriate labels which identify the number display part 120 (No.) showing the reservation recording application order, the broadcasting channel display part 130 (Source), the reservation recording date display part 140 (Date), the reservation recording start time display part 150 (Start), the end time display part 160 (End), the recording speed display part 170 (Mode), the used recording medium display part 180 (To), and the recording status display part 190 (Status) showing completion or non-completion of recording. The reservation recording bibliographic details display part 110b displays information for each item of information identified by the heading display part 110a in the order of the reservation recording applications of the user, and is divided into a general recording information display part 110c and a recording result display part 110d.

The general recording information display part 110c displays general information necessary for recording, and comprises the number display part 120, the broadcasting channel display part 130, the reservation recording date display part 140, the reservation recording start time display part 150 and the end time display part 160.

The broadcasting channel display part 130 displays the broadcasting channel which the user intends to record, the reservation recording date display part 140 displays the recording date, and the reservation recording start time display part 150 and the end time display part 160 display the recording start time and the end time, respectively.

The number display part 120 is sequentially numbered according to the dates displayed on the reservation recording date display part 140. Where the dates are identical, the number display part 120 is numbered according to the start time of the start time display part 150. The number display part 120 may display a predetermined number of programs. When the user intends to register a new recording program, if all of the predetermined numbers are already used, the number display part 120 automatically deletes the first registered program and registers the new program in the last number.

The broadcasting channel display part 130, the reservation recording date display part 140, the reservation recording start time display part 150 and the end time display part 160 may be automatically selected and stored by using a general program guide.

The recording result display part 110d comprises information which is changeable after recording, such as the recording speed display part 170, the used recording medium display part 180, and the recording status display part 190 showing completion or non-completion of recording.

The recording speed display part 170 displays the recording speed of the recording medium designated by the user, and the recording medium display part 180 displays the recording medium for recording the reservation program. Generally in case of a VTR, the recording speed is displayed as a SP (standard play), a LP (long play) or an EP (extended play) which is a double speed of the SP, and SLP (super long play) or XP (extra long play) which is a triple speed of the SP. However, the DVD or HDD that manages the speed in bit rates has not been standardized in speed representation. In the embodiment shown in FIG. 4, in order to clarify that the DVD or HDD is also distinguishable by a specific characteristic, such as bit rate, the specific characteristic may also be displayed as the SP, LP and XP or other appropriately designated characters. Although the recording speed is normally designated by the user, if a residual capacity of the recording medium is not enough, the recording speed is controlled by the control unit 50 to record the whole reservation program. A method of displaying a change in the recording speed may be accomplished in a similar manner as displaying a change of the recording medium which is discussed below.

Although the user normally sets the recording medium, if a residual capacity of the set recording medium is determined to be deficient during recording, the user set recording medium is fully used first, and then the recording is continued on another recording medium. Accordingly, the program set by the user will be completely recorded.

Where the recording medium is changed during recording, the recording medium display part 180 displays change of the recording medium so that the user can easily confirm the recorded contents. For example, where the user selects the DVD as the recording medium, if a space of a DVD disk is not sufficient, the residual contents are recorded on the HDD 30, and change of the recording medium is displayed, for example, as '>>HDD' on the recording medium display part 180.

The recording status display part 190 displays the recording result of the reservation recording program set by the user. That is, completion of recording is displayed as 'O' and non-completion of recording is displayed as 'X', so that the user can easily confirm completion or non-completion of recording.

As described above, the recording result display part 110*d* displays the recording result different from reservation application of the user, so that the user may easily confirm the changed contents and completion or non-completion of recording and conveniently watch the recorded contents.

A method of displaying a recording status display method in accordance with an embodiment of the present invention will now be described with reference to FIG. 3.

The control unit 50 determines whether the current time is the reservation recording time by comparing the current time with the recording time of the reservation program set by the user, by monitoring the recording status display table 100 stored in the flash ROM 40 at operation S210. When the current time is the reservation recording time, the control unit 50 controls the system to receive the set channel and start recording on the set recording medium at the set speed at operation S220. The control unit 50 determines whether recording is completed according to the set end time at operation S230. When recording is successfully finished, the control unit 50 confirms whether the recording medium was changed during recording at operation S240. Where the recording medium was changed, the control unit 50 displays the changed recording medium on the recording medium display part 180 of the recording status display table 100 stored in the flash ROM 40, and displays and stores completion of recording on the recording status display part 190 thereof at operation S250. In this exemplary embodiment, completion of recording is displayed as 'O', and change of the recording medium is display as '>>HDD'. When recording is not successfully performed in operation S230, the control unit 50 displays and stores 'X' implying non-completion of recording on the recording status display part 190 at operation S270. When recording is completed but the recording medium is not changed in S240, the control unit 50 displays 'O' implying completion of recording on the recording status display part 190 and stores the table 100 in the flash ROM 40.

In the table shown in FIG. 3, only examples of completion and non-completion of recording are displayed as 'O' and 'X'. However, if a residual capacity of the recording medium is not enough, or, if recording is intercepted by other factors such as forcible stop by the user, the recording status display part 190 may display more detailed reasons for non-completion of recording by associating other characters with the more detailed reasons. Thereafter, when a display request signal for the recording status display table 100 is input by key operations of the user, the control unit 50 reads the recording status display table 100 from the flash ROM 40, and displays the display table 100 on the display apparatus 85.

As discussed above, in accordance with the exemplary embodiments of the present invention, the recording status display apparatus and the method thereof allow the user to easily confirm the recording status without having to check the recorded contents.

The foregoing embodiment and advantages are merely exemplary and are not to be construed as limiting the present invention. The present teaching may be readily applied to other types of apparatuses.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for receiving an external broadcasting signal, and recording the signal on a recording medium or outputting and displaying a reproduced signal on a display apparatus, the recording and/or reproducing apparatus comprising:
    a memory which stores a recording status display table comprising;
    a general recording information display part which identifies a program to be recorded, and a recording result display part which stores a recording result; and
    a control unit which controls the recording status display table to be displayed on the display apparatus,
    wherein the recording result display part comprises information changeable after recording,
    the information changeable after recording comprises a used recording medium display part, and
    the used recording medium display part displays at least one of a set recording medium in recording and a change of the recording medium if the recording medium changes during recording by the control unit.

2. The apparatus as claimed in claim 1, wherein the control unit records and stores the recording result of a corresponding program on the recording result display part of the memory.

3. The apparatus as claimed in claim 1, wherein the general recording information display part further comprises:
    a number display part which identifies the program to be recorded,
    a broadcasting channel display part which identifies the broadcasting channel from which the program is to be recorded,
    a reservation recording date display part which identifies a date on which the program is to be recorded, and at least one of a reservation recording start time display part or, an end time display part.

4. The apparatus as claimed in claim 1, wherein the information changeable after recording further comprises a used recording medium display part and/or a recording status display part showing completion or non-completion of recording.

5. The apparatus as claimed in claim 4, wherein the recording speed display part displays a set speed in recording, and/or displays a change of the recording speed when the recording speed changes during the recording of program.

6. The apparatus as claimed in claim 4, wherein the recording status display part displays completion or non-completion of the recording of the program.

7. The apparatus as claimed in claim 6, wherein, where the recording of the program is not successfully completed, the recording status display part further displays a reason for the non-completion of the recording of the program.

8. The apparatus as claimed in claim 1, wherein the recording status display table displays a predetermined number of programs in an order of reservation recording dates, and, where the reservation recording dates are identical, the recording status display table displays the programs in an order of reservation recording start times.

9. A method of displaying a recording status of an image recording and reproducing apparatus for receiving an external broadcasting signal, and recording the signal on a recording medium or outputting and displaying the reproduced signal on a display apparatus, the method comprising:
providing a reservation recording application;
creating a recording status display table in response to the reservation recording application, the recording status display table comprising: a general recording information display part which provides a recording date and a recording start time of a predetermined program, a recording result display part which provides a recording result, and a used recording medium display part;
comparing the recording start time of the recording status display table with a current time; and
starting the recording of the predetermined program and recording the recording result in the recording result display part when the recording start time is identical to the current time,
wherein the used recording medium display part displays at least one of a set recording medium in recording and a change of the recording medium if the recording medium changes during recording by the control unit, so that all of the predetermined program is recorded on the recording medium.

10. The method as claimed in claim 9, further comprising displaying the recording status display table on the display apparatus in response to a recording status display table display request.

11. The method as claimed in claim 9, wherein the general recording information display part further comprises at least one of a number display part which identifies the predetermined program, a broadcasting channel display part, or an end time display part.

12. The method as claimed in claim 9, wherein the recording result display part further comprises a recording speed display part, and a recording status display part showing completion and non-completion of recording, and the method further comprises:
changing at least one of the recording speed display part and the recording status display part after completion of the recording of the predetermined program.

13. The method as claimed in claim 12, wherein the recording speed display part displays a user set recording speed or displays a changed recording speed where the speed is changed during the recording of the predetermined program.

14. The method as claimed in claim 12, wherein the recording status display part displays completion or non-completion of the recording of the predetermined program.

15. The method as claimed in claim 14, wherein, where the recording of the predetermined program is not successfully performed, the recording status display part further displays a reason for non-completion of recording.

16. The method as claimed in claim 9, wherein the recording status display table displays a predetermined number of programs in the order of reservation recording dates, and where the reservation recording dates are identical, the recording status display table displays the predetermined programs in an order of reservation recording start time.

* * * * *

UNITED STATES PATENT AND TRADEMARK OFFICE
CERTIFICATE OF CORRECTION

| | |
|---|---|
| PATENT NO. | : 7,660,513 B2 |
| APPLICATION NO. | : 10/968176 |
| DATED | : February 9, 2010 |
| INVENTOR(S) | : Sun-kyung Jin |

Page 1 of 1

It is certified that error appears in the above-identified patent and that said Letters Patent is hereby corrected as shown below:

Column 9, Line 2, change "or," to --or--.

Column 9, Line 9, change "recording," to --recording--.

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO.       : 7,660,513 B2                                    Page 1 of 1
APPLICATION NO.  : 10/968176
DATED            : February 9, 2010
INVENTOR(S)      : Sun-kyung Jin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1512 days.

Signed and Sealed this

Twenty-eighth Day of December, 2010

David J. Kappos
*Director of the United States Patent and Trademark Office*